United States Patent

[11] 3,594,739

[72] Inventor Munir Bitran
Nussbaumen, Switzerland

[21] Appl. No. 868,856
[22] Filed Oct. 23, 1969
[45] Patented July 20, 1971
[73] Assignee Patelhold Patentverwertungs-& Elektro-Holding AG.
Glarus, Switzerland
[32] Priority Oct. 24, 1968
[33] Switzerland
[31] 15901

[54] TWO CORE ONE BIT MAGNETIC SHIFT REGISTER WITH NONDESTRUCTIVE READOUT
8 Claims, 6 Drawing Figs.

[52] U.S. Cl. 340/174 SR
[51] Int. Cl. G11c 19/00
[50] Field of Search 340/174 SR; 307/221

[56] References Cited
UNITED STATES PATENTS 3,289,183 11/1966 Parker et al. 340/174

*Primary Examiner*—James W. Moffitt
*Attorney*—Greene and Durr

ABSTRACT: A magnetic shift register comprises a chain of main magnet cores and intermediate cores interposed between adjacent main cores, each core having a shift winding, an output winding and two input windings interconnected with each other in the manner of a ring counter and with electronic switching means synchronized with a pair of shift current pulse sources alternately exciting respective shifting windings of the main and intermediate cores in series, to enable a threefold operation of the register of a forward and backward shift of the binary information stored in the main cores to respectively the next succeeding and preceding main cores by two partial shifts via the intervening intermediate cores, and of a combined forward and backward partial shift of the information from each main core to an adjacent intermediate core and back to the main core accompanied by the generation of signals in special readout windings of the intermediate cores suitable for detection and nondestructive readout of the information stored in the main cores.

Figure 3:
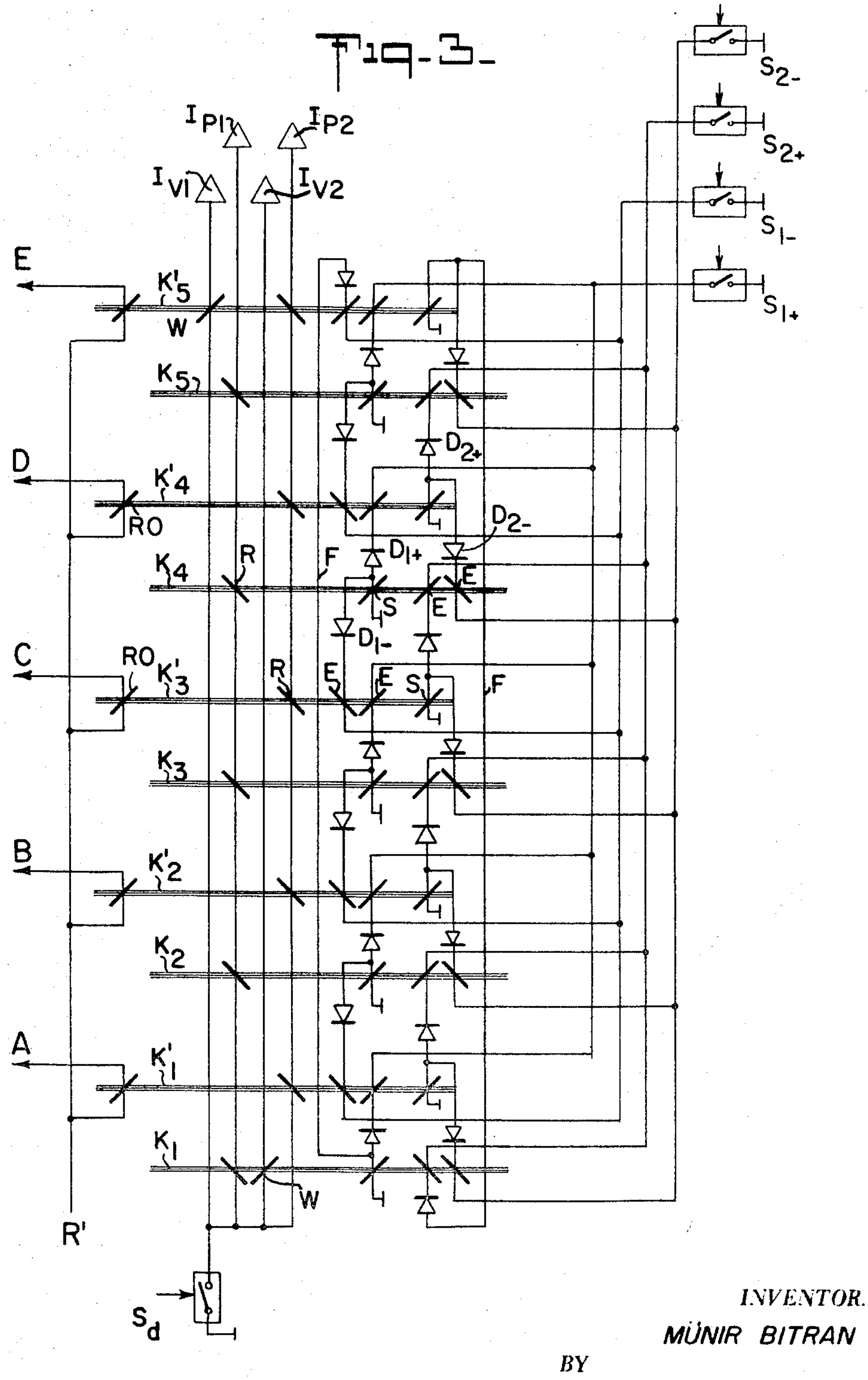

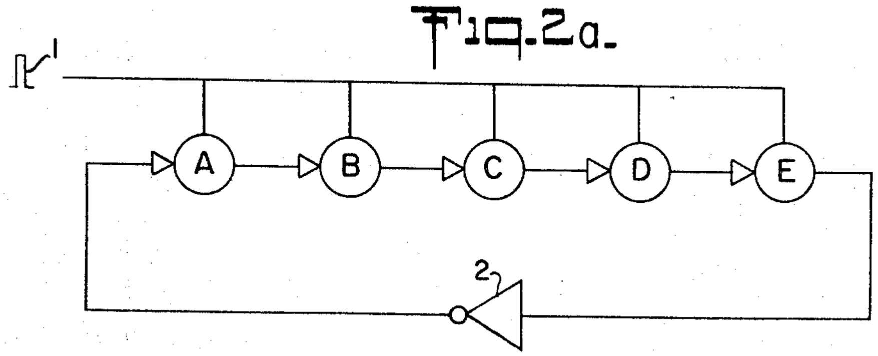
Fig. 2a
Fig. 2b
| | A | B | C | D | E |
|---|---|---|---|---|---|
| 0 | 0 | 0 | 0 | 0 | 0 |
| 1 | 1 | 0 | 0 | 0 | 0 |
| 2 | 1 | 1 | 0 | 0 | 0 |
| 3 | 1 | 1 | 1 | 0 | 0 |
| 4 | 1 | 1 | 1 | 1 | 0 |
| 5 | 1 | 1 | 1 | 1 | 1 |
| 6 | 0 | 1 | 1 | 1 | 1 |
| 7 | 0 | 0 | 1 | 1 | 1 |
| 8 | 0 | 0 | 0 | 1 | 1 |
| 9 | 0 | 0 | 0 | 0 | 1 |
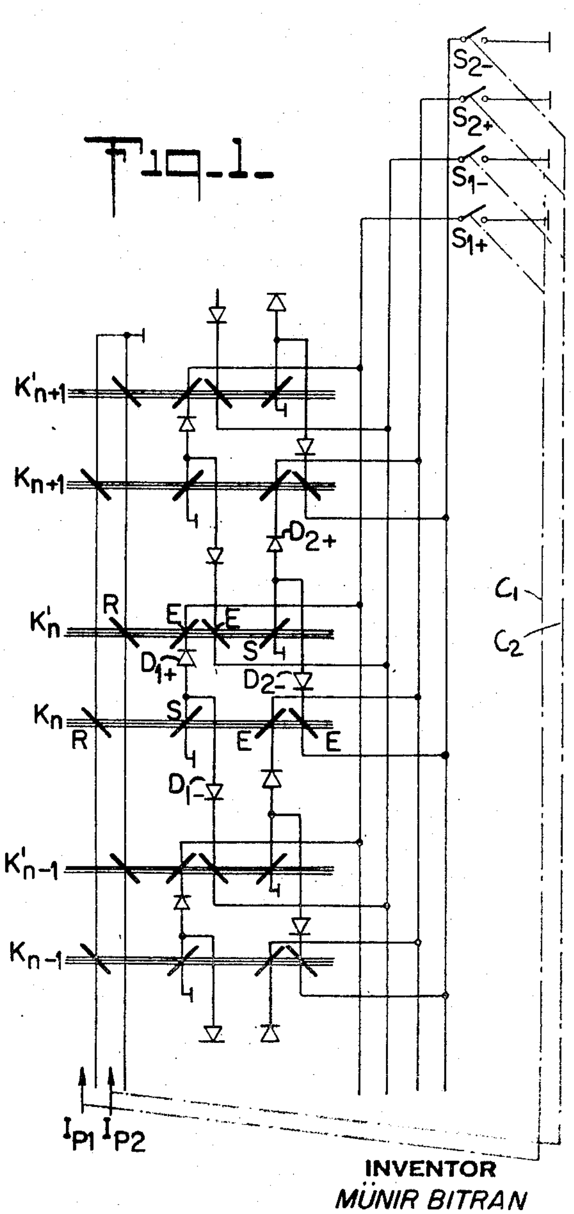
Fig. 1
INVENTOR
MÜNIR BITRAN
BY KARL RATH
ATTORNEY

INVENTOR.
MÜNIR BITRAN
BY
KARL RATH
ATTORNEY

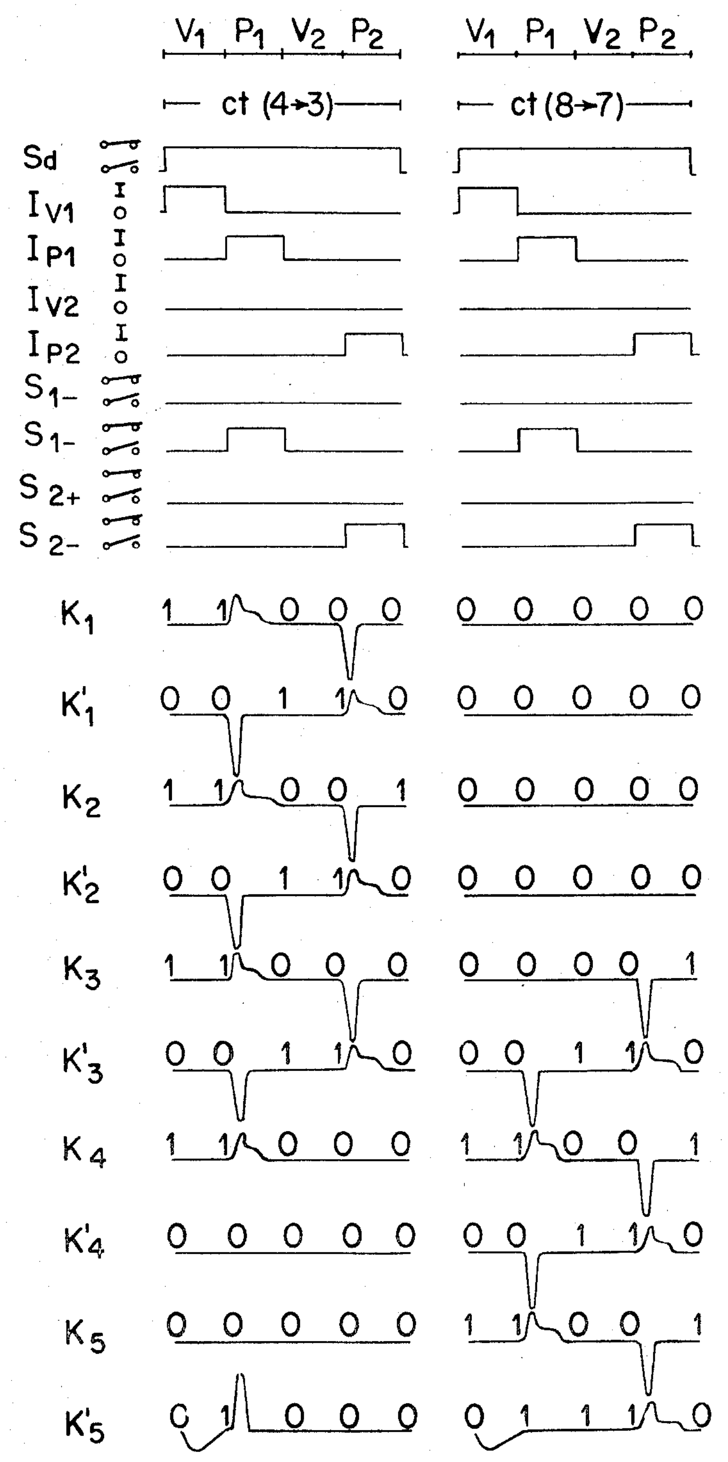
Fig. 4b BY
INVENTOR.
MUNIR BITRAN
KARL RATH
ATTORNEY

INVENTOR.
MÜNIR BITRAN
BY
KARL RATH
ATTORNEY

TWO CORE ONE BIT MAGNETIC SHIFT REGISTER WITH NONDESTRUCTIVE READOUT

The present invention relates to a magnetic shift register of the two core-one bit type with nondestructive readout of the information, comprising main cores and intermediate cores disposed between the main cores, each of said cores having a shift winding, output and input windings with the shift windings of the main cores, on the one hand, and of the intermediate cores on the other hand, being connected with each other and excited during alternating, operating or switching phases, by corresponding current pulse sources.

Magnet core alternate registers with main and intermediate cores, wherein the shift windings of the main cores, on the one hand, and of the intermediate cores, on the other hand, are connected in series and energized by shift pulses during alternate operating phases, have been known for a long time (see for instance the book by K. Cattermole "Transistor Circuits" (Heywood & Co. 1959), p. 351, FIG. 13.32).

A nondestructive parallel readout of the information once stored in such a shift register, is, however, not possible without a considerable expenditure of apparatus, in that it would be necessary, in order to restore, after a readout, the information stored in the main cores prior to said readout, to transfer for instance, the information from the main cores to an electronic flip-flop register enabling an immediate nondestructive readout—resulting in a loss of the information in the main cores—and to subsequently return the information from the flip-flop register to the main cores by the aid of a special "writing pulse." Evidently, such methods are both cumbersome and time consuming.

Accordingly, the invention has for its main object to avoid these disadvantages and to realize a simple shift register composed solely of magnet cores and diodes and based on the principles outlined in the foregoing, which register will enable, aside from the nondestructive readout at any instant of the information stored in the main cores, a shift of the information in both directions.

Another object of the invention is the provision of a magnetic shift register of the referred to type constructed in the form of a ring counter, to enable a nondestructive readout of the counting state, substantially without interference with the normal operation of the counter.

With these objects in view, the invention is characterized in that the output windings of the main cores are connected each via diodes to one of the input windings of both the succeeding and preceding intermediate cores and that the resultant electrical circuits are completed via first electronic switches common to all the main cores, that similarly the output windings of the intermediate cores are connected each via other diodes and one of the input windings of both the succeeding and preceding main cores with further electronic switches common to all intermediate cores, and that the sense of the windings and polarity connection of the diodes is so chosen that, by the application of the exciting current pulses and simultaneous closing of the proper electronic switches during the respective switching phases, there results either a forward or backward shift of the information stored in the main cores by one step composed of two partial steps, by virtue of the inclusion of the auxiliary cores, or that where the directions of the partial steps are opposite to one another, there results a restoration of the original information with the simultaneous generation of electrical signals by the change of the state of magnetization of the intermediate cores suitable for detection and effecting a nondestructive readout of the information stored in the main cores.

According to a further development of the invention, there is proposed its application to a ring counter having $n$ counting states and making use of a known principle involving switching connections to produce a logical inversion of the information between the last and the first and between the first and last stage, respectively, of the counter, whereby $n$ counting stages will enable the attainment of counting combinations between zero and 0 and $2n$ (Möbius-Counter). With the aid of two additional switching phases it becomes possible, in this manner, to realize such a circuit with the additional advantage of a destruction-free parallel readout, at any time, of the information stored in the cores, in a manner as will become more apparent as the description proceeds.

Figure 4A:
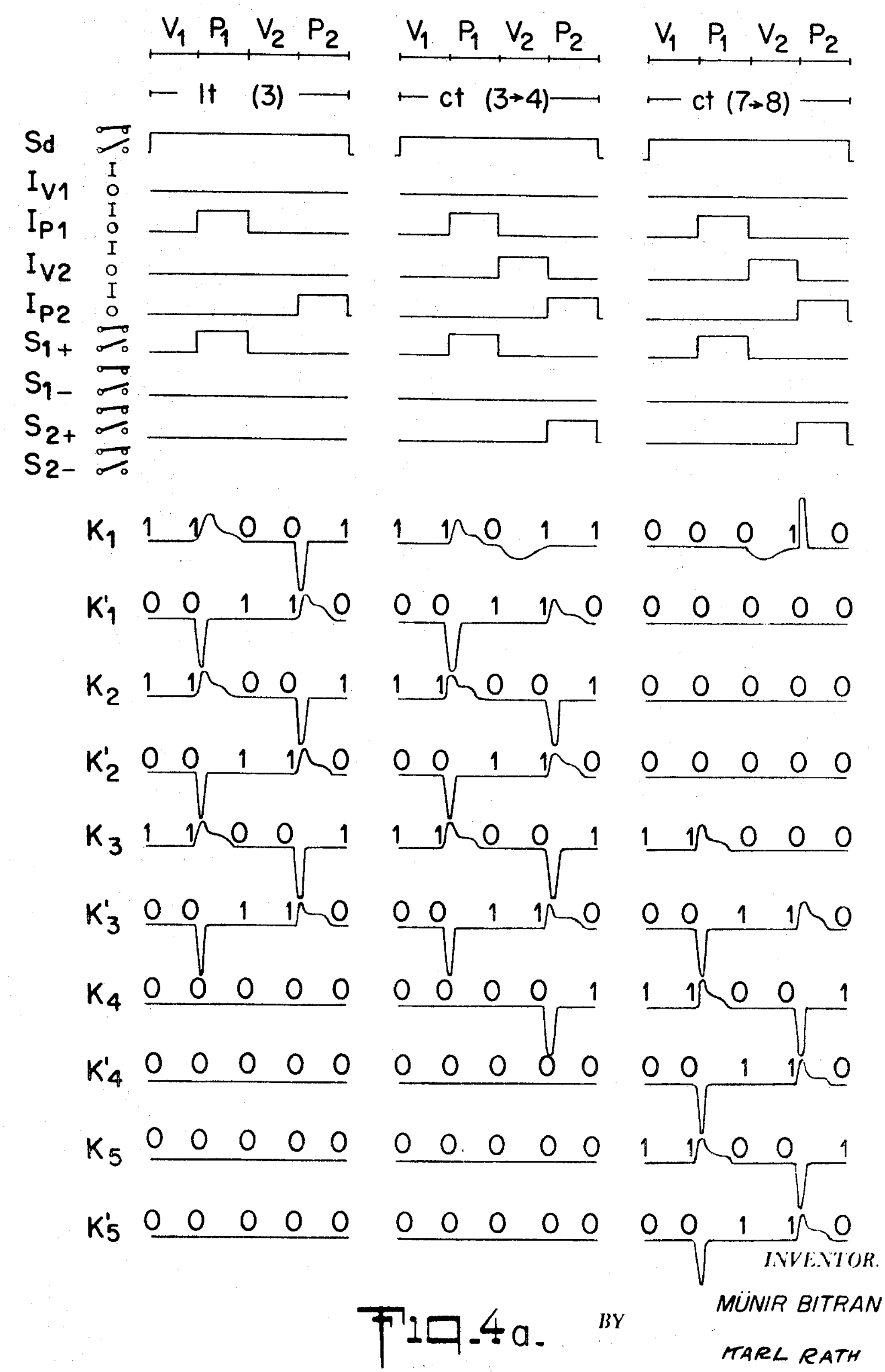

The invention, both as to the foregoing and ancillary objects, as well as novel objects thereof, will be better understood from the following detailed description, taken in conjunction with the accompanying drawings forming part of this disclosure in which:

FIG. 1 is a principle circuit diagram of the magnet core shift register according to the invention;

FIG. 2*a* shows the basic diagram of a known ring counter having $n$ stages with a maximum of counting states of $2n$;

FIG. 2*b* is a table showing the shift of the counting states in such a ring counter;

FIG. 3 shows the application of the invention for the realization of the counting principle according to FIG. 2*a*, including additional means for effecting a destruction-free readout of the momentary counting state; and FIGS. 4*a* and 4*b* are pulse diagrams illustrative of the shift of the information and readout in a ring counter according to FIG. 3.

Like reference characters denote like parts throughout the different views of the drawings.

Referring more particularly to FIG. 1, there are shown three stages of a magnet shift register constructed in accordance with the invention, that is, six cores altogether, or three main cores denoted by $K_{n11}$, $K_n$, $K_{n+1}$, and three auxiliary or intermediate cores denoted by $K'_{n11}$, $K'_n$, $K'_{n+1}$. Each core has four windings, viz a shift winding R, and output winding S and two input windings E, as shown for the core $K_n'$. The exciting windings of the main cores K are connected to the current pulse source $I_{P1}$ which supplies a pulse during a first operating or switching phase, and the exciting windings of the auxiliary cores K′ are connected to the current pulse source $I_{P2}$ which supplies a switching pulse during a second operating phase. The output windings of the main cores K are connected each via diodes $D_{1+}$ with the input windings of the succeeding intermediate cores K′, the resultant circuits being closed by the common electronic switch $S_{1+}$, and said output windings are furthermore connected each via diodes $D_{11}$ with the input windings of the preceding auxiliary cores, the resultant circuits being closed via the common electronic switch $S_{11}$. Similarly, the output windings of the auxiliary cores K′ are each connected in exactly the same manner via diodes $D_{2+}$ and $D_{21}$ with the input windings of the succeeding and preceding main cores K, the resultant circuits being closed respectively through the common electronic switches $S_{2+}$ and $S_{21}$. It is to be noted that each thus resulting coupling circuit including an output winding, a diode and an input winding, may pass a current only upon closing of the coordinated electronic switch, synchronized with the respective current pulse source $I_{P1}$ and $I_{P2}$, as indicated by the dot-dash lines $C_1$ and $C_2$, due regard being given to the current-passing direction of the diodes.

While the magnet cores K and K′ are shown, for simplicity of illustration, in the form of straight or bar magnets, it is understood that the cores may be of ring shape or closed upon themselves in accordance with conventional practice.

In explaining the operation of the system of FIG. 1, it is assumed that all cores K′ are in the "0" state and that the cores K may be either in the "0" or "1" state depending upon the binary information stored in the cores. Only the stage $n$ will be considered, since the operation of the remaining stages is the same. During a first phase a shift current pulse $I_{P1}$ is supplied and either of the switches $S_{1+}$ and $S_{11}$ is closed. If the core $K_n$ is in the "1" state, the exciting current causes a switching of this core to the "0" state, whereby to induce a voltage in its output winding. This voltage produces a current passing through the input winding of $K'_n$, provided $S_{1+}$ is closed, or through the input winding of $K'_{n11}$, if $S_{11}$ is closed. This current causes a switching of the cores $K'_n$ or $K'_{n11}$ to the "1" state. Simultaneously, with this voltage in the output windings, voltages are induced in the input windings of the core $K_n$. These voltages cannot, however, produce a current since the electronic switches $S_{2+}$ and $S_{21}$ are open during the first switching phase and accordingly do not pass any current. If the core $K_n$ was in the "0" state, no voltage is induced in the output winding, whereby the core $K_n$ is unable to influence and intermediate core. It will be seen, therefore, that a core $K_n$ is in the "0" state at the end of the first phase and that a binary information previously contained therein has been shifted to $K'_n$, if $S_{1+}$ is closed or to $K'_{n11}$, if $S_{11}$ is closed. Expressed otherwise, the effect is a partial shift the direction of which can be selected by the aid of the electronic switches $S_{1+}$ and $S_{11}$.

During the second switching phase a shifting current pulse $I_{P2}$ is supplied and one of the switches $S_{2+}$ or $S_{21}$ is closed, while $S_{1+}$ AND $S_{11}$ remain open. The physical phenomena taking place are the same as before with the state of $K'_n$ being shifted to $K_{n+1}$ or $K_n$, involving thereby a second partial shift the direction of which is determined respectively by the aid of switches $S_{2+}$ AND $S_{21}$. From this, it follows that two positive partial shifts result in a shift of the register by one step in the positive (forward) direction and that two negative partial shifts result in a shift by one step in the negative (backward) direction, while one positive and one negative partial shift results in a total shift equal to zero accompanied by the generation of voltage pulses in the windings of the auxiliary cores, suitable for effecting readout of the information stored in the main cores. In this manner, there is enabled the realization of the above-mentioned threefold operating mode of the shift register (forward shift, backward shift, destruction-free parallel readout).

There will now be described the application of the invention to a ring counter operating according to the "Möbius-Principle." According to this principle, the binary output of the register, as pointed out above, is inversed and fed back upon the input, whereby with $n$ counting stations counting up to $2n$ is possible. To begin with, the principle will be explained by reference to the block diagram of FIG. 2*a*. The counter shown comprises five bistable switching stages designated by A,B,C,D,E and accordingly enabling counting from 0—9. Shift pulses 1 are applied in a known manner to all the stages and the information of the last stage E is fed back upon the first stage A through a suitable binary inverter Z. It is assumed that each counting stage includes means capable of assuming the state defined by an input signal at the instant preceding the occurrence of a shift pulse, that is, including means to store this state during a shifting operation. Assuming further that all the counting stages are initially in the state "0," the counting sequence will be as shown in FIG. 2*b*, wherein each stage assumes, during a shift, the state of the preceding stage prior to said shift, with the exception of the stage A receiving the inverse binary value of E existing prior to a shift. As can be seen, there may be realized in this manner 10 states by the counting ring with the result of a return from the state 9 to the state 0. In order to count in the negative direction, all that is required is to reverse the shifting direction.

FIG. 3 according to the invention illustrates the shift register combined with a ring counter according to FIG. 2. The ring counter comprises five stages each of which has a main core $K_1$—$K_5$ and an auxiliary or intermediate core $K'_1$—$K'_5$, the windings of which are mutually interconnected in the manner shown by FIG. 1, except for the addition of the coupling circuits between $K'_5$ and $K_1$, of the auxiliary current pulse sources $I_{V1}$ and $I_{V2}$, and of the windings connected to these sources. These switching elements enable an inversion of the state of magnetization during the shift from $K'_5$ to $K_1$, and vice versa, in accordance with the operation of the "-Möbius-Principle" illustrated by FIG. 2. The realization of such a reversal of the state of magnetization requires, in addition to the switching phases $P_1$ and $P_2$, two preparatory switching phases $V_1$ and $V_2$, the sequence of effectiveness of all the phases being $V_1$—$P_1$—$V_2$—$P_2$. For forward counting, the current pulse source $I_{V2}$ supplies a current pulse during phase $V_2$, while the electronic switches $S_{1+}$, $S_{11}$, $S_{2+}$, $S_{21}$ are open, while for backward counting, the current pulse source $I_{V1}$ supplies a current pulse during phase $V_1$, while the same switches are open. During readout, nothing happens within the phases $V_1$ and $V_2$.

The process of inversion between the fifth and first stage during forward counting is as follows: during phase $P_1$, a pulse $I_{P1}$ is supplied, switch $S_{1+}$ is closed and the state of $K_5$ is transferred to $K'_5$, in the manner described above. During phase $V_2$, current pulse $I_{V2}$ causes a change of $K_1$ (which core has been switched to the state "zero" under the influence of pulse $I_{P1}$) to the state "1." During the $P_{21}$ interval, the intermediate core $K'_5$, assuming it to be in the "1" state, undergoes a change of state, whereby the voltage induced in its output winding produces a current via the input winding of $K_1$ and the switch $S_{2+}$, which, considering the winding sense of the input winding, has as a result, the return of this core to the "0" state. If $K'_5$ has been in the "0" state, no voltage will be induced thereby, whereby $K_1$ remains in the "1" state. The reversal during backward counting (between the first and fifth stage) is similar, yet completed at the end of the $P_{11}$ phase. During the $V_{11}$ phase, the $I_{V1}$ pulse shifts the core $K'_5$ to the "1" state: During the $P_{11}$ phase, there is produced in the output winding of $K_1$ a voltage, assuming the core to have been in the "1" state, which voltage acts to return $K'_5$ to the "0" state. If however $K_1$ has been in the "0" state, $K'_5$ will remain in the "1" state. As a consequence, a reversal has been effected and the registered state corresponds to the state of $K_5$ during the $P_{21}$ phase.

The pulse diagram shown by the coordinated FIGS. 4*a* and 4*b* illustrate the sequence of the exciting current pulses, of the switching conditions of the electronic switches, of the state of magnetization of the cores and the voltages induced in the windings of the cores during a readout operation ("1*t*") and various cases of counting positions ("*ct*").

As will be understood, it is necessary for the attainment of a satisfactory operation of the magnetic ring counter to make sure that the cores at the start of a counting operation are in one of the combination of states shown by FIG. 2*b*. As a matter of fact, any other combination which may exist at the start, can no longer be corrected and will reappear cyclically, since the ring counter operates in a manner of a shift register. In order to avoid such a condition, there may be provided a pushbutton enabling the production of cycles during which the electronic switches $S_{1+}$, $S_{11}$, $S_{2+}$, $S_{21}$ (FIG. 3) remain open and the cores are returned to the "0" state without the pulses induced in their output windings being able to influence other cores. In this manner, the "0" combination, FIG. 2*b*, at the start of the device may be set manually.

In order to enable a parallel readout of the information in the magnetic ring counter, the intermediate cores K' are provided with readout windings RO, FIG. 3. Each of these windings has one of its ends opposite to the output ends connected to a common reference voltage R' by means of which the information read out from terminals A—E may be either rendered possible or blocked. The voltages induced in these windings have a shape as shown in FIGS. 4*a* and 4*b* ($K'_1$ to $K'_5$). As can be seen therefrom, the negative pulses represent the number contained in the ring counter to be read out in accordance with the code represented by FIG. 2*b*, which however is not always correct as far as the counting operation is concerned. For this reason, the information readout is released solely during the readout cycles ("1*t*"), FIG. 4*a* and *b*. *Sd* is a further switch serving to select the proper decade.

In the foregoing the invention has been described in reference to a specific exemplary device. It will be evident, however, that variations and modifications, as well as the substitution of equivalent parts or devices for those shown for illustration, may be made without departing from the broader spirit and purview of the invention.

I claim:

1. A magnetic shift register comprising in combination:

1. a chain of main magnet cores, 2. intermediate cores interposed between each two adjacent main cores,
3. each of said main and intermediate cores having a shift winding, a pair of input windings, and an output winding,
4. first and second shift current pulse sources connected respectively to the shift windings of said main and intermediate cores in series, to apply a series of partial shift current pulses to said windings during alternate shifting phases,
5. two pairs of electronic switches with each pair being synchronized with one of said shifting phases,
6. first circuit connections connecting each of the output windings of said main cores to an input winding of both the succeeding and preceding intermediate cores via the switches of one of said pairs, and
7. second circuit connections connecting each of the output windings of said intermediate cores to an input winding of both the succeeding and preceding main cores via the switches of the other of said pairs,
8. whereby to enable a threefold operation of said register, first, of a forward shift of the binary information stored in each main core to the succeeding main core in two partial shifts via the intervening intermediate cores and by synchronous operation of said first pair of switches with said shift current pulse sources, second, of a backward shift of the binary information in each of said main cores to the preceding main core by two partial shifts via the intervening intermediate cores and synchronous operation of said second pair of switches with said shift current pulse sources, and third, of a combined forward and backward partial shift of the binary information in each main core to an adjacent intermediate core and back to said main core, to produce a change of the magnetization in said intermediate core suitable for selection and readout.

2. A magnetic shift register as claimed in claim 1, including circuit connections operably connecting the first and last stages of said register in the manner of a ring counter.

3. A magnetic shift register as claimed in claim 1, including circuit connections operably connecting the first and last stages of said register in the manner of a ring counter, and means to invert the binary information upon switching, during forward counting, from the last stage to the first stage of the register, and to invert the binary information upon switching, during backward counting, from the first to the last stage of the register, respectively.

4. A magnetic shift register as claimed in claim 1, including circuit connections operably connecting the first and last stages of the register in the manner of a ring counter, and a readout winding upon each of the intermediate cores, said readout windings having one end connected to a common reference voltage, to enable a parallel readout from the opposite ends of the windings of the information stored in the main cores.

5. A shift register as claimed in claim 1, including circuit connections operably connecting the first and last cores of said register in the manner of a ring counter, means to invert the binary information upon switching, during forward counting, from the last stage to the first stage of the register and to invert the binary information upon switching, during backward counting, from the first to the last register stage, and readout winding upon each of the intermediate cores, said readout windings having one end connected to a common reference voltage, to enable a parallel readout from the opposite ends of the windings of the binary information stored in the main cores.

6. A shift register as claimed in claim 1, including circuit connections operably connecting the first and the last stage of said register in the manner of a ring counter, means to invert the binary information upon switching, during forward counting, from said last to said first register stage and to invert the binary information upon switching, during backward counting, from said first to said last register stage, and comprising a pair of auxiliary current pulse sources effective during auxiliary shifting phases intervening between said first and second shifting phases, and a pair of auxiliary windings upon the first main core and upon the last intermediate core of said register connected respectively to said auxiliary pulse sources.

7. A shift register as claimed in claim 6, including a plurality of readout windings each disposed upon one of said intermediate cores.

8. A shift register as claimed in claim 7, including periodic switch means controlling all said pulse sources during switching periods each encompassing a cycle of main and auxiliary switching phases.